US012727056B2

(12) United States Patent
Fujishiro

(10) Patent No.: US 12,727,056 B2
(45) Date of Patent: Sep. 1, 2026

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 342 days.

(21) Appl. No.: 18/505,551

(22) Filed: Nov. 9, 2023

(65) Prior Publication Data

US 2024/0080939 A1 Mar. 7, 2024

Related U.S. Application Data

(63) Continuation of application No. PCT/JP2022/019485, filed on May 2, 2022.

(30) Foreign Application Priority Data

May 10, 2021 (JP) ................................ 2021-080060

(51) Int. Cl.

| | |
|---|---|
| ***H04W 76/40*** | (2018.01) |
| ***H04L 5/00*** | (2006.01) |
| ***H04W 76/20*** | (2018.01) |

(52) U.S. Cl.

CPC ........... *H04W 76/40* (2018.02); *H04L 5/0053* (2013.01); *H04W 76/20* (2018.02)

(58) Field of Classification Search

None

See application file for complete search history.

(56) References Cited

U.S. PATENT DOCUMENTS

| | | | | |
|---|---|---|---|---|
| 12,108,308 | B2 * | 10/2024 | Liu | H04W 52/0216 |
| 2016/0212692 | A1 * | 7/2016 | Lee | H04W 48/14 |
| 2024/0049256 | A1 * | 2/2024 | Zhang | H04L 5/0035 |
| 2024/0080879 | A1 * | 3/2024 | Kim | H04W 72/569 |

FOREIGN PATENT DOCUMENTS

| | | |
|---|---|---|
| JP | 2013-066249 A | 4/2013 |

OTHER PUBLICATIONS

"3rd Generation Partnership Project; Technical Specification Group Radio Access Network; NR; NR and NG-RAN Overall Description; Stage 2"; Release 16; 3GPP TS 38.300 V16.3.0 (Sep. 2020); pp. 1-148.

Kyocera, "Further consideration of control plane aspects for NR MBS", 3GPP TSG-RAN WG2 #113bis-e, R2-2103372, Online, Apr. 12-20, 2021, total 9 pages.

Huawei, HiSilicon, "On coordinated switch from NW for MUSIM device", 3GPP TSG-RAN WG2 Meeting #113bis electronic, R2-2103588, Online, Apr. 12-20, 2021, total 6 pages.

* cited by examiner

*Primary Examiner* — Robert M Morlan

(74) *Attorney, Agent, or Firm* — Studebaker Brackett PLLC

(57) ABSTRACT

A communication control method according to a first aspect is used in a mobile communication system for providing a multicast broadcast service (MBS). The communication control method includes: receiving, by a user equipment in a Radio Resource Control (RRC) connected state, multicast data from a base station, the multicast data being MBS data transmitted in multicast; and transmitting, from the user equipment to the base station, state information indicating an RRC inactive state as an RRC state preferred by the user equipment, when the user equipment supports reception of the multicast data in the RRC inactive state.

9 Claims, 9 Drawing Sheets

COMMUNICATION CONTROL METHOD AND USER EQUIPMENT

RELATED APPLICATIONS

The present application is a continuation based on PCT Application No. PCT/JP2022/019485, filed on May 2, 2022, which claims the benefit of Japanese Patent Application No. 2021-080060 filed on May 10, 2021. The content of which is incorporated by reference herein in their entirety.

TECHNICAL FIELD

The present disclosure relates to a communication control method and user equipment used in a mobile communication system.

BACKGROUND OF INVENTION

In recent years, a mobile communication system of the fifth generation (5G) has been attracting attention. New Radio (NR), which is a Radio Access Technology (RAT) of the 5G system, has features such as high speed, large capacity, high reliability, and low latency as compared to Long Term Evolution (LTE), which is a fourth-generation radio access technology.

CITATION LIST

Non-Patent Literature

Non-Patent Document 1: 3GPP Technical Specification "3GPP TS 38.300 V16.3.0 (2020-09)"

SUMMARY

A communication control method according to a first aspect is used in a mobile communication system for providing a multicast broadcast service (MB S). The communication control method includes: receiving, by a user equipment in an RRC connected state, multicast data from a base station, the multicast data being MBS data transmitted in multicast; and transmitting, from the user equipment to the base station, state information indicating an RRC inactive state as an RRC state preferred by the user equipment when the user equipment supports reception of the multicast data in the RRC inactive state.

The communication control method according to a second aspect is used in a mobile communication system for providing a multicast broadcast service (MB S). The communication control method includes: receiving, by a user equipment in an RRC connected state, multicast data from a base station, the multicast data being MBS data transmitted in multicast; receiving, by the user equipment, a request for transitioning to an RRC inactive state from the base station, and transmitting, by the user equipment to the base station, an acknowledgement to the request when the user equipment supports reception of the multicast data in the RRC inactive state.

A communication control method according to a third aspect is used in a mobile communication system for providing a multicast broadcast service (MBS). The communication control method includes: transmitting, by a user equipment to a base station, capability information indicating that the user equipment supports reception of multicast data in an RRC inactive state, when the user equipment supports the reception of the multicast data in the RRC inactive state.

A user equipment according to a fourth aspect includes a processor performing the communication control method according to any one of the first aspect to the third aspect.

DESCRIPTION OF EMBODIMENTS

Introduction of multicast broadcast services to the 5G system (NR) has been under study. NR multicast broadcast services are expected to provide enhanced services as compared to LTE multicast broadcast services.

The present disclosure provides an improved multicast broadcast service.

A mobile communication system according to an embodiment is described with reference to the drawings. In the description of the drawings, the same or similar parts are denoted by the same or similar reference signs.

Configuration of Mobile Communication System

Figure 1:
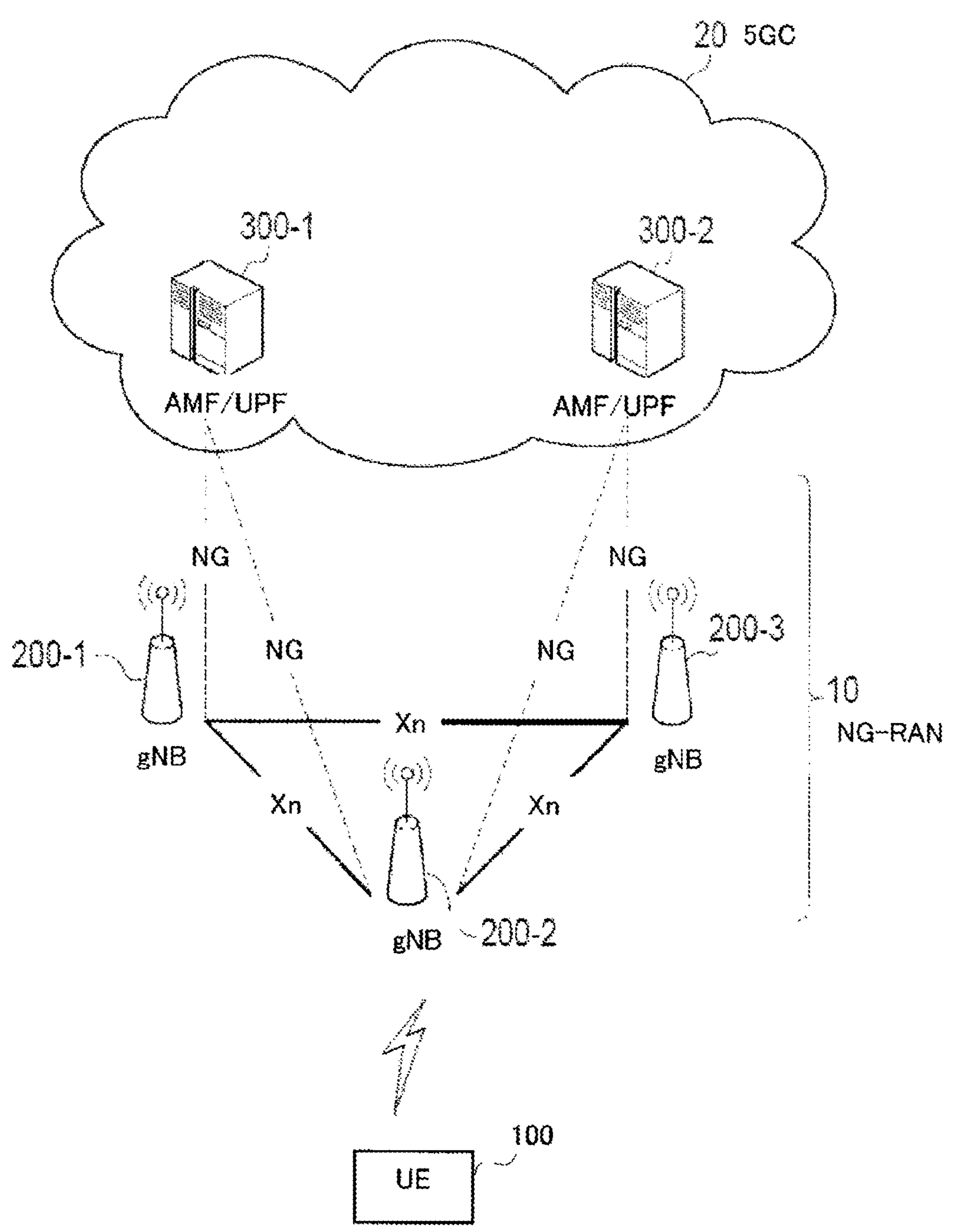
FIG. 1 is a diagram illustrating a configuration of a mobile communication system according to an embodiment.

First, a configuration of a mobile communication system according to an embodiment is described. FIG. 1 is a diagram illustrating a configuration of a mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system. A sixth generation (6G) system may also be at least partially applied to the mobile communication system.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the apparatus is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can also connect to an Evolved Packet Core (EPC) corresponding to an LTE core network. An LTE base station can also be connected to the 5GC. The LTE base station and the gNB can be connected via an inter-base station interface.

The 5GC 20 includes an Access And Mobility Management Function (AMF) and a User Plane Function (UPF) 300. The AMF performs various types of mobility control and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between the base station and the core network.

Figure 2:
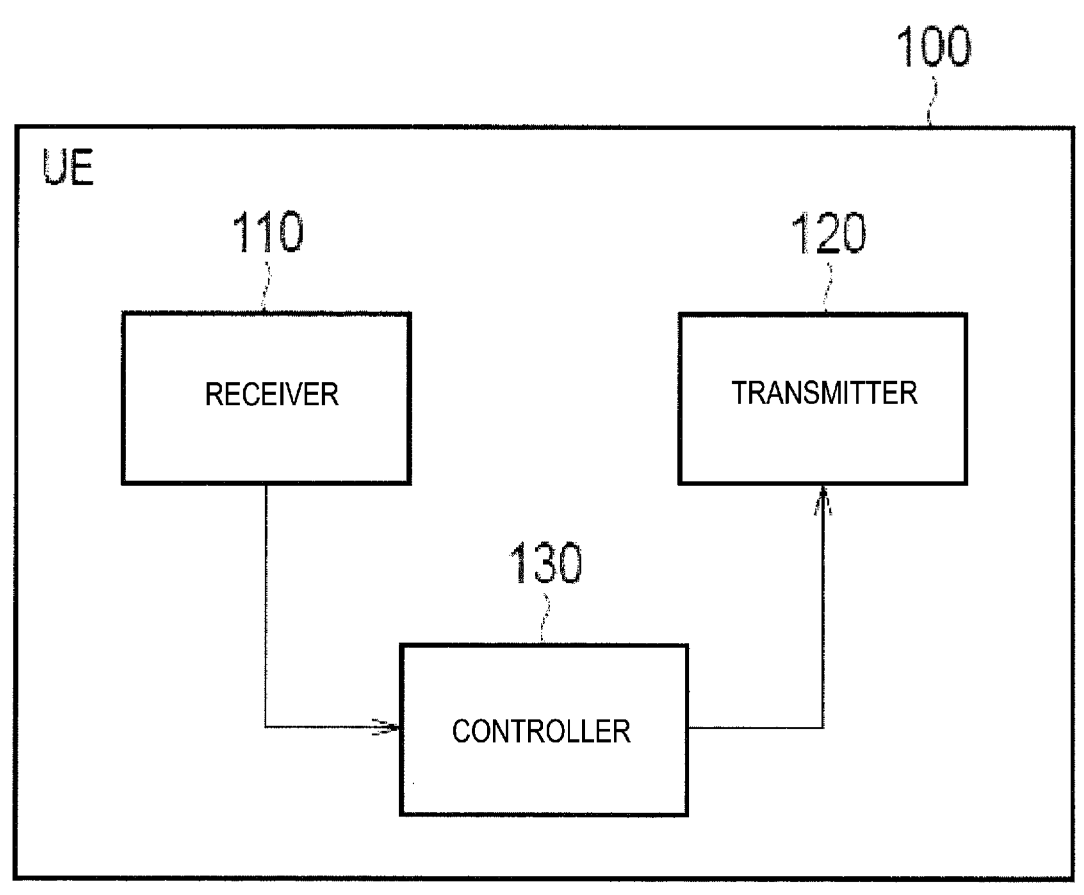
FIG. 2 is a diagram illustrating a configuration of user equipment (UE) according to an embodiment.

FIG. 2 is a diagram illustrating a configuration of the user equipment (UE) 100 according to an embodiment.

The UE 100 includes a receiver 110, a transmitter 120, and a controller 130 as illustrated in FIG. 2.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
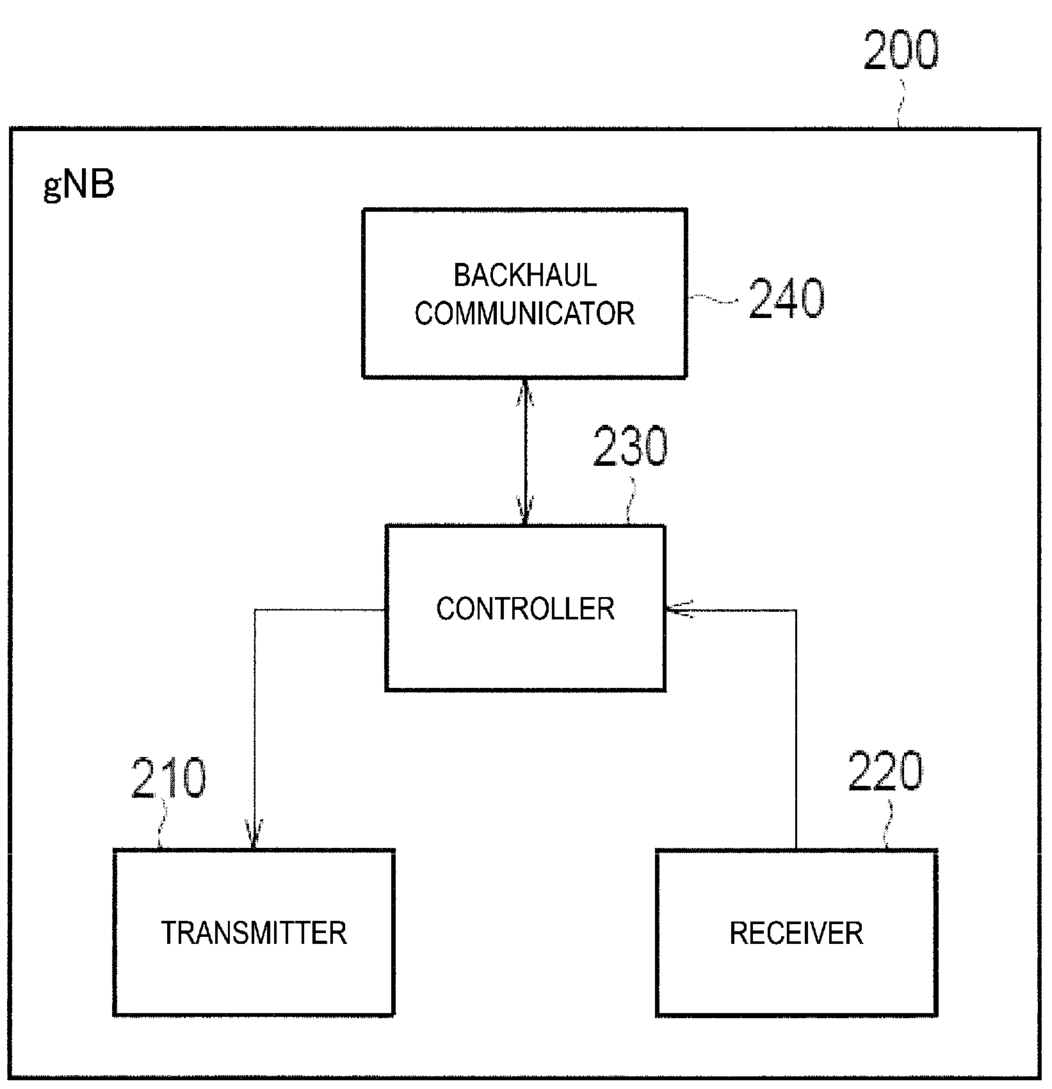
FIG. 3 is a diagram illustrating a configuration of a gNB (base station) according to an embodiment.

FIG. 3 is a diagram illustrating a configuration of the gNB 200 (base station) according to an embodiment.

The gNB 200 includes a transmitter 210, a receiver 220, a controller 230, and a backhaul communicator 240 as illustrated in FIG. 3.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to an AMF/UPF 300 via the interface between the base station and the core network. Note that the gNB may include a Central Unit (CU) and a Distributed Unit (DU) (i.e., functions are divided), and both units may be connected via an F1 interface.

Figure 4:
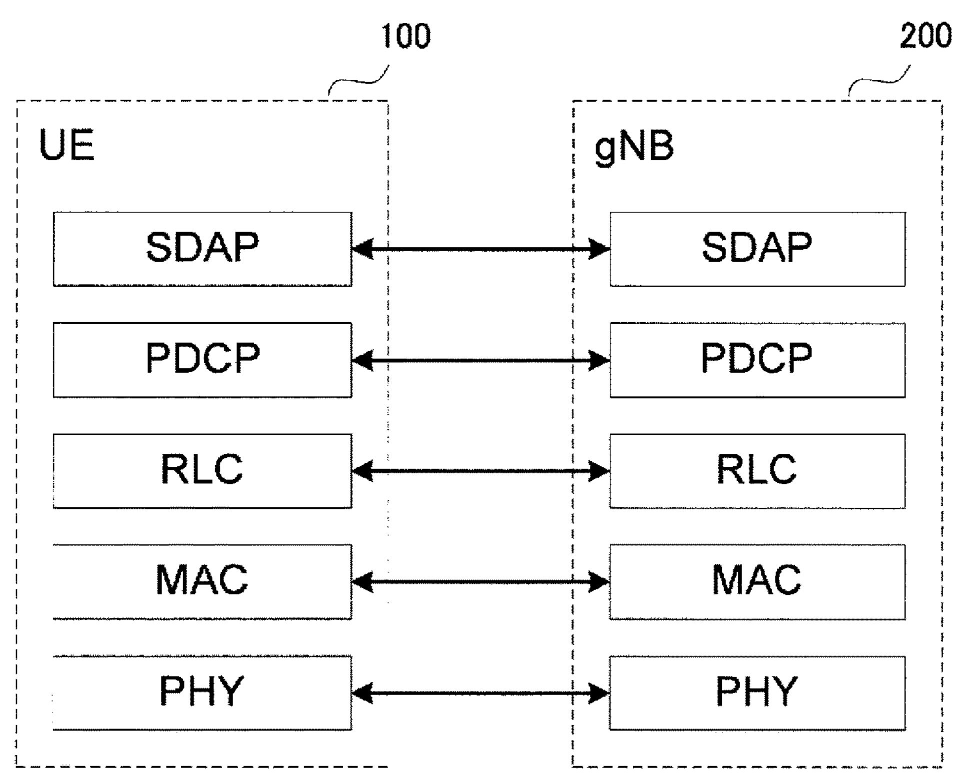
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink, and resource blocks to be allocated to the UE 100.

The RLC layer transmits data to the RLC layer on the reception side using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of Quality of Service (QoS) control performed by the core network and a radio bearer as the unit of QoS control performed by an Access Stratum (AS). Note that when the RAN is connected to the EPC, the SDAP need not be provided.

Figure 5:
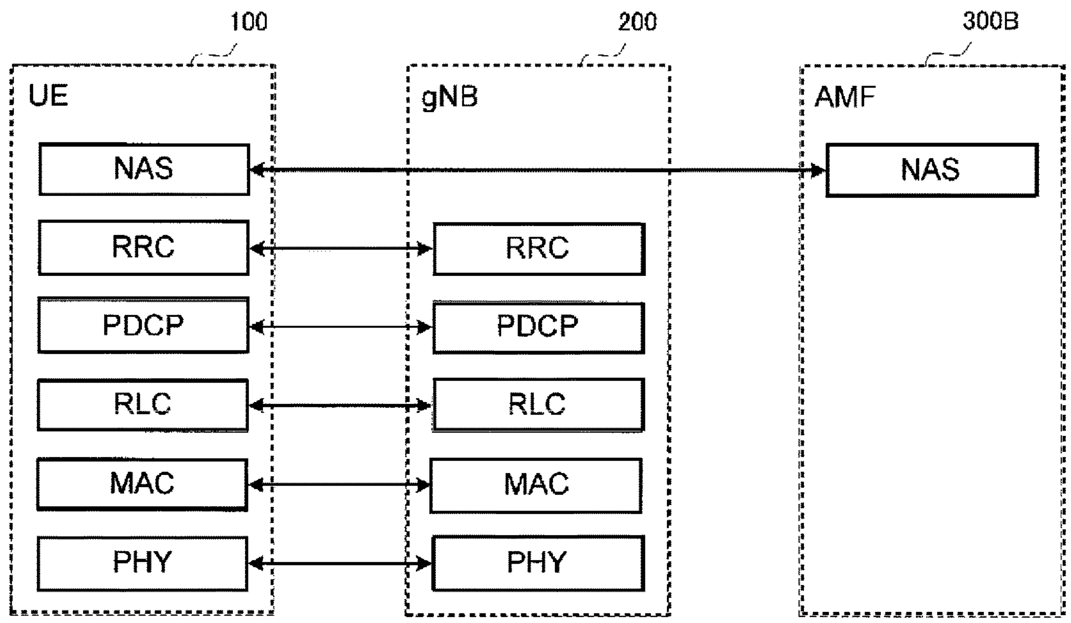
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (a control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned above the RRC layer performs session management, mobility management, and the like. NAS signaling is transmitted between the NAS layer of the UE 100 and the NAS layer of an AMF 300B.

Note that the UE 100 includes an application layer other than the radio interface protocols.

MBS

An MBS according to an embodiment is described. The MBS is a service in which the NG-RAN 10 can provide broadcast or multicast, i.e., Point To Multipoint (PTM) data transmission to the UE 100. The MBS may be referred to as a Multimedia Broadcast and Multicast Service (MBMS). Note that use cases (service types) of the MBS include public safety communication, mission critical communication, Vehicle to Everything (V2X) communication, IPv4 or IPv6 multicast delivery, Internet Protocol Television (IPTV), group call, and software delivery.

Figure 6:
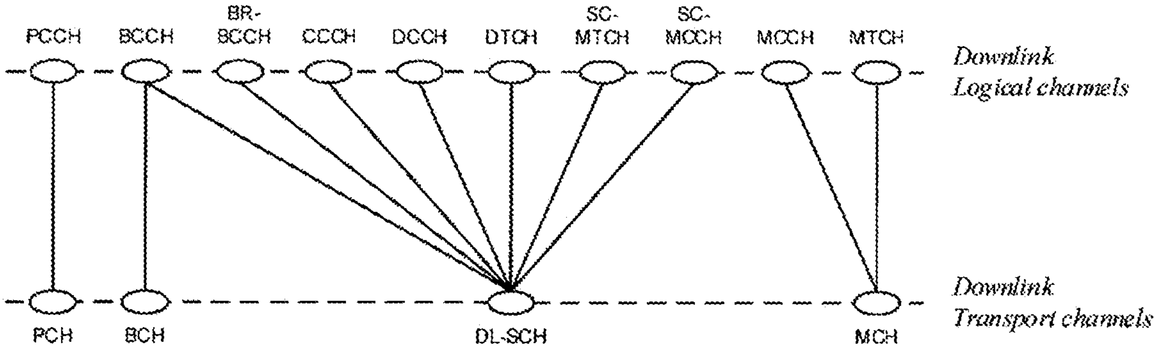
FIG. 6 is a diagram illustrating a correspondence relationship between downlink Logical channels and downlink Transport channels according to an embodiment.

MBS Transmission in LTE includes two schemes, i.e., a Multicast Broadcast Single Frequency Network (MBSFN) transmission and Single Cell Point To Multipoint (SC-PTM) transmission. FIG. 6 is a diagram illustrating a correspondence relationship between downlink Logical channels and downlink Transport channels according to an embodiment.

The logical channels used for MBSFN transmission are a Multicast Traffic Channel (MTCH) and a Multicast Control Channel (MCCH), and the transport channel used for MBSFN transmission is a Multicast Channel (MCH) as illustrated in FIG. 6. The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission and corresponds to broadcast or multicast data transmission on a cell-by-cell basis. The physical channels used for SC-PTM transmission are a Physical Downlink Control Channel (PDCCH) and a Physical Downlink Shared Channel (PDSCH), and enable dynamic resource allocation.

Although an example is mainly described below in which the MBS is provided using a scheme same as, and/or similar to, the SC-PTM transmission scheme, the MBS may be provided using the MBSFN transmission scheme. An example is mainly described in which the MBS is provided using multicast. Accordingly, the MBS may be interpreted as multicast. Note that the MBS may be provided using broadcast.

MBS data refers to data provided through the MBS. An MBS control channel refers to the MCCH or the SC-MCCH. An MBS traffic channel refers to the MTCH or the SC-MTCH. Note that the MBS data may be transmitted in unicast. The MBS data may be referred to as MBS packets or MBS traffic.

A network can provide different MBS services for respective MBS sessions. An MBS session is identified with at least one of a Temporary Mobile Group Identity (TMGI) and a Session identifier (Session ID). At least one of these identifiers is referred to as an MBS session identifier. Such an MBS session identifier may be referred to as an MBS service identifier or a multicast group identifier. The MBS session identifier may be a G-RNTI described below.

The MBS session includes a multicast session and a broadcast session.

The multicast session is a session for delivering a multicast service. The multicast service provides a service to a group of UEs 100 joining a multicast session for an application requiring highly reliable QoS. The multicast session can be used by the UE 100 in the RRC connected state. The multicast session can also be used by the UE 100 in an RRC inactive state. Hereinafter, MBS data transmitted in multicast (MBS data belonging to a multicast session) will be referred to as multicast data.

The broadcast session is a session for delivering a broadcast service. The broadcast service provides a service to every UE 100 within a particular service area. The broadcast session can be used by the UE 100 in all RRC states (RRC idle state, RRC inactive state, and RRC connected state).

Figure 7:
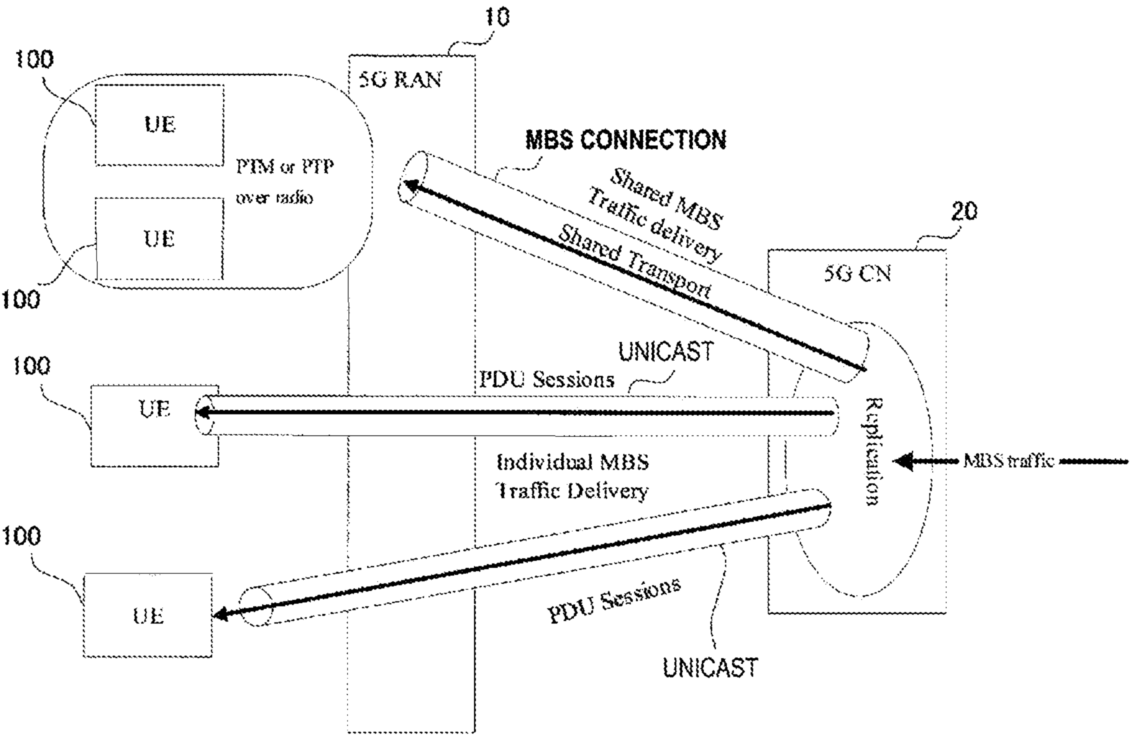
FIG. 7 is a diagram illustrating a delivery method of MBS data according to an embodiment.

FIG. 7 is a diagram illustrating a delivery method of the MBS data according to an embodiment.

The MBS data (MBS Traffic) is delivered from a single data source (application service provider) to a plurality of UEs as illustrated in FIG. 7. The 5G CN (5GC) 20, which is a 5G core network, receives the MBS data from the application service provider and performs Replication of the MBS data to deliver the resulting data.

From the perspective of the 5GC 20, two delivery methods are possible: shared MBS data delivery (Shared MBS Traffic delivery) and individual MBS data delivery (Individual MBS Traffic delivery).

In the shared MBS data delivery, a connection is established between the NG-RAN 10 that is a 5G radio access network (5G RAN) and the 5GC 20 to deliver the MBS data from the 5GC 20 to the NG-RAN 10. Such a connection (a tunnel) is hereinafter referred to as an "MBS connection".

The MBS connection may be referred to as a Shared MBS Traffic delivery connection or a shared transport. The MBS connection terminates at the NG-RAN 10 (i.e., the gNB 200). The MBS connection may correspond to an MBS session on a one-to-one basis.

The gNB 200 selects any transmission scheme among Point-to-Point (PTP: unicast) and Point-to-Multipoint (PTM: multicast or broadcast) at the discretion thereof. The gNB 200 transmits the MBS data to the UE 100 using the selected transmission scheme.

On the other hand, in the individual MBS data delivery, a unicast session is established between the NG-RAN 10 and the UE 100 to individually deliver the MBS data from the 5GC 20 to the UE 100. Such unicast may be referred to as a PDU Session. The unicast (PDU session) terminates at the UE 100.

Split MBS Bearer

A split MBS bearer according to an embodiment is described.

The gNB 200 may establish an MBS bearer split into a PTP communication path and a PTM communication path (hereinafter referred to as a "split MBS bearer" as appropriate) for the UE 100. This allows the gNB 200 to dynamically switch transmission of the MBS data to the UE 100 between PTP (PTP communication path) and PTM (PTM communication path). The gNB 200 may perform duplicate transmission of the same MBS data using both PTP (PTP communication path) and PTM (PTM communication path) to enhance reliability.

A predetermined layer terminating the split is the MAC layer (HARQ), the RLC layer, the PDCP layer, or the SDAP layer. An example in which the predetermined layer terminating the split is the PDCP layer is mainly described below. However, the predetermined layer may be the MAC layer (HARQ), the RLC layer, or the SDAP layer.

Figure 8:
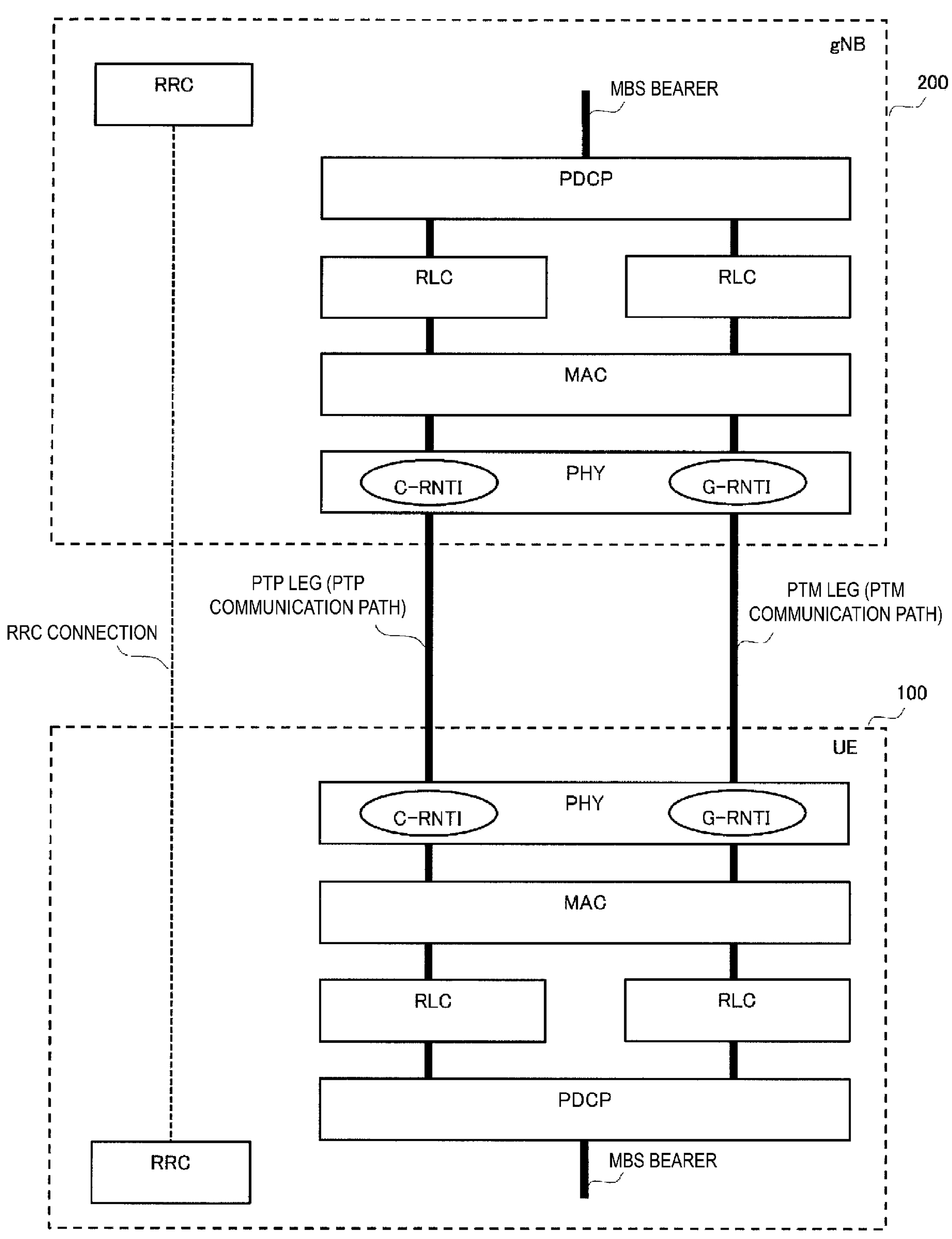
FIG. 8 is a diagram illustrating a split MBS bearer according to an embodiment.

FIG. 8 is a diagram illustrating the split MBS bearer according to an embodiment. Hereinafter, the PTP communication path is referred to as a PTP leg, and the PTM communication path is referred to as a PTM leg. A functional unit corresponding to each layer is referred to as an entity. In the PTM leg, MBS data is transmitted in multicast.

As illustrated in FIG. 8, each of the PDCP entity of the gNB 200 and the PDCP entity of the UE 100 splits an MBS bearer, which is a bearer (data radio bearer) used for the MBS, into a PTP leg and a PTM leg. Note that the PDCP entity is provided for each bearer.

Each of the gNB 200 and the UE 100 includes two RLC entities provided for the respective legs, one MAC entity, and one PHY entity. The PHY entity may be provided per leg. Note that in Dual Connectivity in which the UE 100 communicates with two gNBs 200, the UE 100 may include two MAC entities.

The PHY entity transmits and receives data of the PTP leg using a Cell Radio Network Temporary Identifier (Cell RNTI (C-RNTI)) that is allocated to the UE 100 on a one-to-one basis. The PHY entity transmits and receives data of the PTM leg using a Group Radio Network Temporary Identifier (Group RNTI (G-RNTI)) allocated to the MBS session on a one-to-one basis. The C-RNTI is different for each UE 100, but the G-RNTI is an RNTI common to a plurality of UEs 100 receiving one MBS session.

In order to perform PTM transmission of the MBS data (multicast or broadcast) from the gNB 200 to the UE 100 using a PTM leg, a split MBS bearer needs to be established for the UE 100 from the gNB 200 and the PTM leg needs to be activated. In other words, even if a split MBS bearer is configured for the UE 100, when a PTM leg is in a deactivated state, the gNB 200 cannot perform the PTM transmission of the MBS data using the PTM leg.

In order for the gNB 200 and the UE 100 to perform PTP transmission of the MBS data (unicast) using a PTP leg, a split MBS bearer needs to be established for the UE 100 from the gNB 200 and the PTP leg needs to be activated. In other words, even if a split MBS bearer is established for the UE 100 when the PTP leg is in a deactivated state, the gNB 200 cannot perform the PTP transmission of the MBS data using the PTP leg.

When the PTM leg is in an activated state, the UE 100 monitors a Physical Downlink Control Channel (PDCCH) to which a G-RNTI associated with the MBS session is applied (i.e., performs blind decoding of the PDCCH using the G-RNTI). The UE 100 may monitor the PDCCH only at a scheduling occasion of the MBS session.

When the PTM leg is in a deactivated state, the UE 100 does not monitor a PDCCH to which a G-RNTI associated with the MBS session has been applied (i.e., does not perform blind decoding of the PDCCH using the G-RNTI).

When the PTP leg is in an activated state, the UE 100 monitors a PDCCH to which a C-RNTI has been applied. When Discontinuous Reception (DRX) in the PTP leg is configured, the UE 100 monitors a PDCCH for a configured OnDuration period. When a cell (frequency) associated with the MBS session is specified, the UE 100 may monitor a PDCCH for the cell even when the cell is deactivated.

When the PTP leg is in a deactivated state, the UE 100 may monitor a PDCCH to which a C-RNTI has been applied in preparation for normal unicast downlink transmission of data other than the MBS data. Note that when a cell (frequency) associated with an MBS session is specified, the UE 100 need not monitor the PDCCH for the MBS session.

Note that it is assumed that the above-described split MBS bearer is established by use of an RRC message (e.g., an RRC Reconfiguration message) transmitted by the RRC entity of the gNB 200 to the RRC entity of the UE 100.

Reception of Multicast Data in RRC Inactive State

Reception of multicast data in an RRC inactive state according to an embodiment is described.

In an embodiment, when the UE 100 supports reception (reception function) of multicast data in the RRC inactive state, the UE 100 continues to receive multicast data even after transitioning from the RRC connected state to the RRC inactive state. In this case, the UE 100 continuously applies an MBS configuration provided through the RRC Reconfiguration message in the RRC connected state as an MBS configuration used in the RRC inactive state. That is, the UE 100 reuses the MBS configuration provided in the RRC connected state.

In other words, when the UE 100 is in the RRC connected state, the UE 100 receives, from the base station, an RRC Reconfiguration message (RRC message) including the MBS configuration necessary for the MBS reception. After transitioning from the RRC connected state to the RRC inactive state, the UE 100 performs MBS reception using the MBS configuration received when in the RRC connected state.

Such an MBS configuration may include a basic reception configuration being a basic configuration for MBS reception, and an RRC connected dedicated configuration being applicable only to MBS reception in the RRC connected state.

The basic reception configuration is a configuration common to all of the RRC states (i.e., RRC connected state, RRC idle state, and RRC inactive state). The basic reception configuration includes MTCH scheduling information. The MTCH scheduling information includes at least one selected from the group consisting of a group RNTI (G-RNTI), an MBS session identifier, a transmission occasion, and a transmission Bandwidth Part (BWP).

The group RNTI is an RNTI commonly allocated to the group of UEs 100. The transmission occasion is a candidate for a timing (e.g., subframe) at which the gNB 200 transmits MBS traffic using the MTCH. The transmission BWP is a BWP in which the gNB 200 transmits the MBS traffic using the MTCH. The BWP is a bandwidth part that is narrower than the frequency bandwidth of one cell and is for limiting the operating bandwidth of the UE 100.

On the other hand, the RRC connected dedicated configuration is a configuration related to the split MBS bearer or the like, and includes, for example, at least one selected from the group consisting of a bearer configuration of the split MBS bearer, a dynamic switching configuration between PTP and PTM, and a PTP leg configuration. Note that PTM leg configuration can be used even in the RRC idle state or the RRC inactive state, and the basic reception configuration may thus include the PTM leg configuration. The RRC connected dedicated configuration may include a HARQ feedback configuration.

First Operation Pattern

A first operation pattern according to an embodiment is described.

The gNB 200 may cause some of the UEs 100 to receive the multicast data to transition to the RRC inactive state at the time of multicast data transmission due to being in a congested state. However, the gNB 200 does not know which UE 100 is to be caused to transition to the RRC inactive state. Note that the congested state may occur due to, for example, uplink transmission (uplink data, Channel State Information (CSI) feedback, or the like) by the UEs 100 receiving multicast data. The congested state may be resolved by causing the UEs 100 to transition to the RRC inactive state.

When the UE 100 supports reception of multicast data in the RRC inactive state in the first operation pattern, the UE 100 transmits state information indicating the RRC inactive state to the gNB 200 as an RRC state preferred by the UE 100. As a result, the gNB 200 understands that there will be no problem if the UE 100 is caused to transition to the RRC inactive state, and can cause the UE 100 to transition to the RRC inactive state when the congested state occurs.

When the UE 100 does not support reception of multicast data in the RRC inactive state in the first operation pattern, the UE 100 transmits state information indicating the RRC connected state to the gNB 200 as an RRC state preferred by the UE 100. As a result, the gNB 200 understands that the UE 100 is not allowed to be caused to transition to the RRC inactive state, and does not cause the UE 100 to transition to the RRC inactive state even when the congested state occurs.

Figure 9:
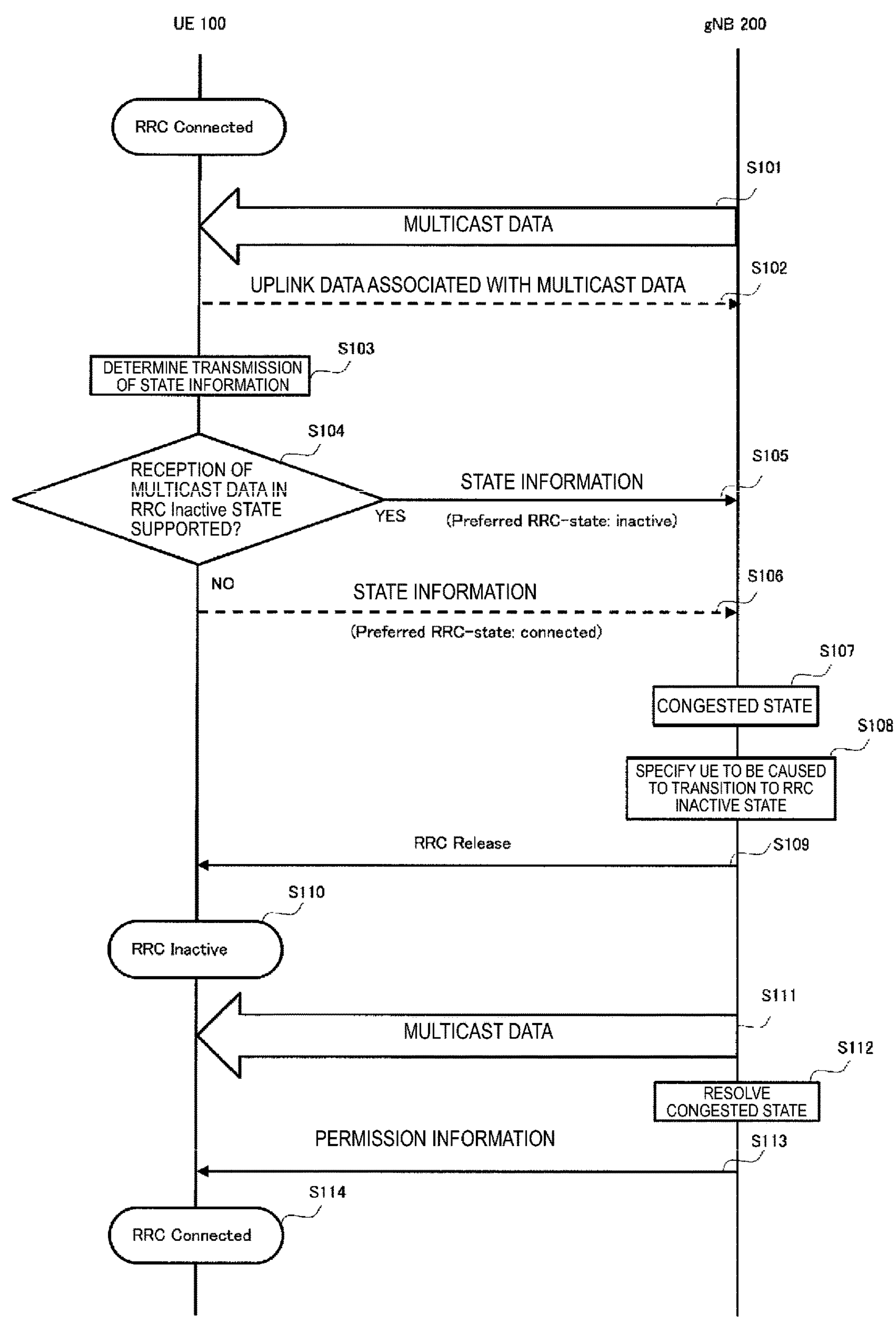
FIG. 9 is a diagram illustrating an operation example of a first operation pattern according to an embodiment.

FIG. 9 is a diagram illustrating an operation example of the first operation pattern according to an embodiment. In the initial state of FIG. 9, it is assumed that the UE 100 is in an RRC connected state and MBS configuration has been established from the gNB 200 to the UE 100.

In step S101, the UE 100 receives multicast data from the gNB 200 as illustrated in FIG. 9. Specifically, the UE 100 receives the multicast data using the MBS configuration configured by the gNB 200.

Note that the UE 100 may transmit uplink data associated with the multicast data in step S102. The uplink data associated with the multicast data is uplink data associated with a multicast session to which the multicast data belongs. For example, when the multicast session corresponds to a group call service, the uplink data associated with the multicast session is data corresponding to speaking in a group call.

In step S103, the UE 100 determines to transmit state information indicating an RRC state preferred by the UE 100 (Preferred RRC-state) to the gNB 200. For example, if normal data transmission/reception in unicast is not expected, the UE 100 determines to transmit the state information. The UE 100 may determine to transmit the state information in response to an instruction from the gNB 200. The instruction may be an instruction requesting transmission of the state information (preferred RRC state) or an inquiry about the state information (preferred RRC state). The instruction may be transmitted by means of unicast signaling (using a C-RNTI), multicast signaling (using a G-RNTI), and/or broadcast signaling (using an SI-RNTI). Note that a system Information (SI)-RNTI is an RNTI used for transmission and/or reception of a system information block. The UE 100 may determine to transmit the state information if the gNB 200 is configured to periodically transmit the state information and the transmission timing has arrived.

In step S104, the UE 100 determines whether the UE 100 supports reception of the multicast data in the RRC inactive state.

When determining that the UE 100 supports reception of the multicast data in the RRC inactive state (step S104: YES), the UE 100 transmits state information indicating the RRC inactive state (Preferred RRC-state: inactive) as an RRC state desired by the UE 100 to the gNB 200 in step S105. Such state information is included in a UE Assistance Information message that is a type of RRC message and transmitted, for example.

When determining that the UE 100 does not support reception of the multicast data in the RRC inactive state (step S104: NO), the UE 100 may transmit state information indicating the RRC connected state (Preferred RRC-state: connected) as an RRC state desired by the UE 100 to the gNB 200 in step S106. Note that in this case, the UE 100 need not transmit the state information.

When the UE 100 transmits uplink data in step S102, the UE 100 may configure the contents of the state information to be transmitted in further consideration of whether transmission of the uplink data is expected. Specifically, when transmission of the uplink data is not expected, the UE 100 transmits state information indicating the RRC inactive state (Preferred RRC-state: inactive) to the gNB 200. When transmission of the uplink data is expected, the UE 100 transmits the state information indicating the RRC connected state (Preferred RRC-state: connected) to the gNB 200.

When the contents of the state information are configured in response to the fact that normal transmission and/or reception of data in unicast is not expected, the UE 100 may rewrite the configured contents in response to reception of multicast data. As an example, the UE 100 configured the contents of the state information to "idle" (Preferred RRC-state: idle) or "outOfConnected" (Preferred RRC-state: outOfConnected) in response to the fact that normal transmission and/or reception of data in unicast is not expected. In this case, the UE 100 supporting reception of the multicast data in the RRC inactive state rewrites the content to "inactive" in response to the reception of the multicast data. Note that "outOfConnected" indicates that the RRC state desired by the UE 100 is the RRC idle state or the RRC inactive state. As another example, the UE 100 configures the contents of the state information to "idle", "inactive", or "outOfConnected" in response to the fact that normal transmission and/or reception of data in unicast is not expected. In this case, the UE 100 not supporting reception of the multicast data in the RRC inactive state rewrites the contents to "connected" in response to the reception of the multicast data.

Description will be continued below on the assumption that the UE 100 has transmitted the state information indicating the RRC inactive state to the gNB 200.

In step S107, the gNB 200 detects that a congested state has occurred. Note that when the gNB 200 transmits an instruction in step S103, the detection of the congested state may be performed before step S103. That is, the gNB 200 may transmit an instruction in response to detection of the congested state.

In step S108, the gNB 200 specifies the UE 100 to be caused to transition to the RRC inactive state.

The gNB 200 may specify the UE 100 having transmitted the state information indicating the RRC inactive state as UE 100 to be caused to transition to the RRC inactive state among UE 100 receiving the multicast data. Note that the gNB 200 can specify the UE 100 receiving the multicast data by receiving information through an MBS interest indication message (MII) from the UE 100 in advance.

The gNB 200 may specify the UE 100 to be caused to transition to the RRC inactive state by further considering the movement state of the UE 100. Specifically, the gNB 200 may specify the UE 100 that is not moving as the UE 100 to be transitioned to the RRC inactive state.

For the UE 100 that is moving, the gNB 200 may need to perform handover control to guarantee continuity of the MBS service. For this reason, the moving UE 100 preferably remains in the RRC connected state. On the other hand, the UE 100 that is not moving does not need to maintain in the RRC connected state, and thus the UE 100 that is not moving may be caused to transition to the RRC inactive state.

Note that the gNB 200 may specify the UE 100 staying in the cell of the gNB 200 longer than a predetermined period of time as the UE 100 that is not moving. The gNB 200 may specify the UE 100 that is not moving based on position information periodically received from the UE 100. The gNB 200 may specify the UE 100 that is not moving by being notified of the movement state from the UE 100. The notification may be given by a request from the gNB 200 and/or determination of the UE 100 itself (e.g., when the movement state changes). The movement state may be transmitted using an MBS interest indication (MII). The movement state may be transmitted in association with interest information on MBS reception.

In step S109, the gNB 200 transmits an RRC Release message to the UE 100 specified in step S108. The UE 100 receives the RRC Release message. The gNB 200 transmits, to the UE 100, an RRC Release message including suspend config as an information element when causing the UE 100 to transition to the RRC inactive state. The RRC Release message may include a timer value of a timer for measuring a waiting time.

In step S110, the UE 100 transitions to the RRC inactive state based on the received RRC Release message.

In step S111, the UE 100 continuously receives the multicast data in the RRC inactive state. For example, the UE 100 reuses the MBS configuration provided in the RRC connected state to receive the multicast data.

In step S112, the gNB 200 detects that the congested state has been resolved.

In step S113, the gNB 200 transmits permission information for permitting the UE 100 in the RRC inactive state to transition to the RRC connected state. The UE 100 receives the permission information from the gNB 200. The gNB 200 may transmit the permission information in broadcast or multicast. For example, the gNB 200 may transmit the permission information in a System Information Block (SIB). The gNB 200 may transmit the permission information in a MAC Control Element (CE). The MAC CE is transmitted on an MBS traffic channel (MTCH) using a G-RNTI. The gNB 200 may transmit the permission information via an MBS control channel (MCCH). The gNB 200 may transmit the permission information in TMGI paging. The TMGI paging is group paging for a group (a group corresponding to a TMGI) of the UE 100 receiving an MBS session corresponding to multicast data. The gNB 200 may transmit the permission information in individual paging to each of the UE 100 specified in step S108.

In step S114, the UE 100 transitions to the RRC connected state in response to receiving the permission information. Specifically, the UE 100 transmits an RRC Resume Request message to the gNB 200 by performing a random access procedure on the gNB 200, receives an RRC Resume Message from the gNB 200, and transitions to the RRC connected state. Note that when the RRC Release message received in step S109 includes a timer value, the UE 100 may start the timer in response to the transition to the RRC inactive state, and may transition to the RRC connected state in response to the expiration of the timer. Note that the expiration of the timer may indicate that the transition to the RRC connected state is permitted. In this case, the UE 100 may transmit an RRC Resume Request message to the gNB 200 in response to the expiration of the timer. After the expiration of the timer, the UE 100 may transmit the RRC Resume Request message to the gNB 200 at a time point at which transition to the RRC connected state is preferred (e.g., when uplink data transmission becomes necessary).

Second Operation Pattern

A second operation pattern according to an embodiment is described focusing on differences from the above-described operation pattern.

In the second operation pattern, the UE 100 in the RRC connected state receives a request for a transition to the RRC inactive state from the gNB 200. The UE 100 transmits an acknowledgement to the request to the gNB 200 when the UE 100 supports reception of multicast data in the RRC inactive state. As a result, the gNB 200 understands that there will be no problem if the UE 100 is caused to transition to the RRC inactive state, and can cause the UE 100 to transition to the RRC inactive state when the congested state occurs.

Figure 10:
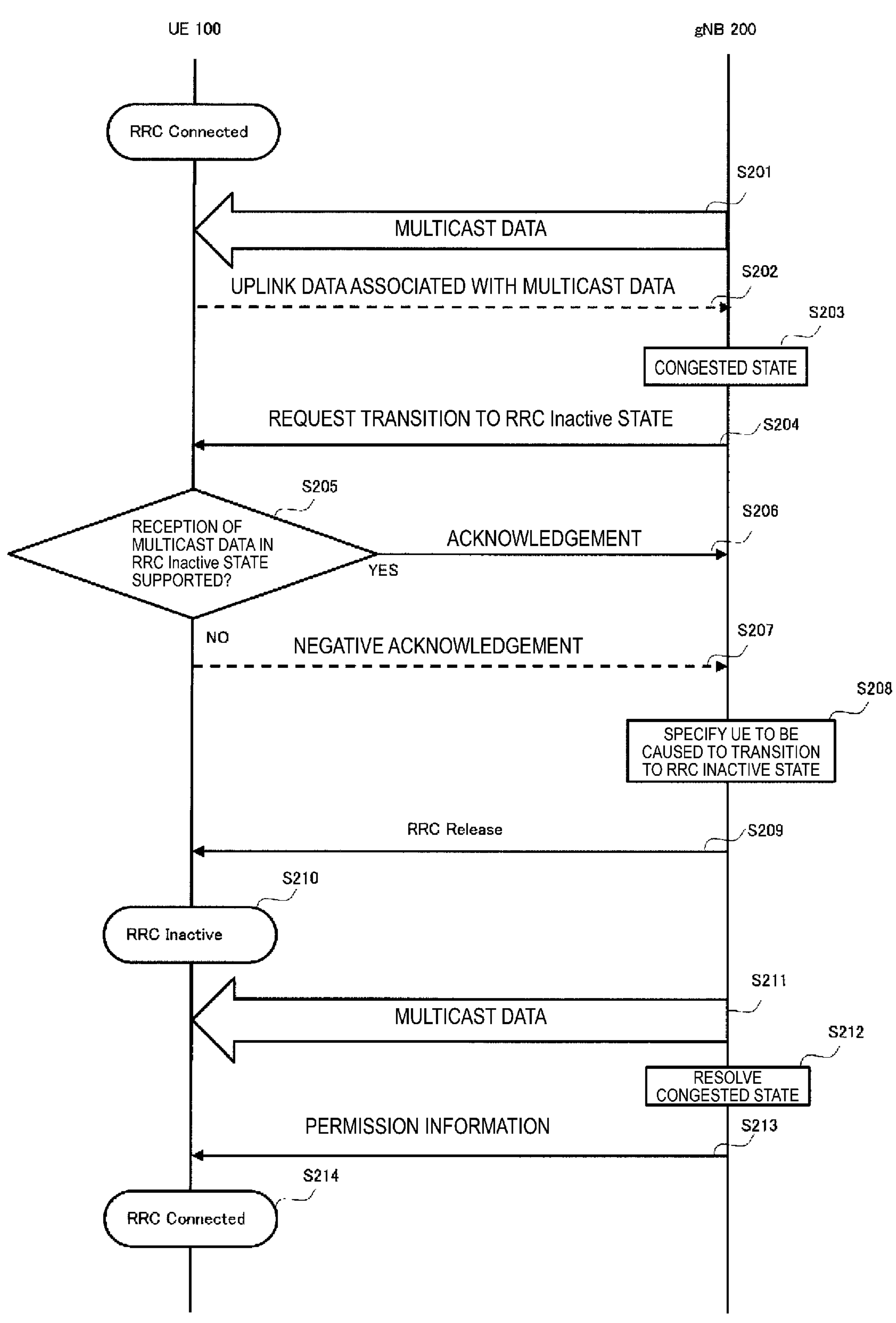
FIG. 10 is a diagram illustrating an operation example of a second operation pattern according to an embodiment.

FIG. 10 is a diagram illustrating an operation example of the second operation pattern according to an embodiment. In the initial state of FIG. 10, it is assumed that the UE 100 is in an RRC connected state and MBS configuration has been configured from the gNB 200 to the UE 100.

The operations of steps S201 and S202 are same as and/or similar to the operations of steps S101 and S102 as illustrated in FIG. 10.

In step S203, the gNB 200 detects that a congested state has occurred.

In step S204, the gNB 200 transmits a request message for requesting a transition to the RRC inactive state to the UE 100 receiving multicast data. The request message may be a message for inquiring to the UE 100 about whether the UE 100 may be caused to transition to the RRC inactive state. The request message may include an MBS session identifier (TMGI, Session ID, G-RNTI, etc.) corresponding to the multicast data. The request message may include information indicating a time in which the UE is to be maintained in the RRC inactive state.

The gNB 200 may transmit the request message in broadcast or multicast. For example, the gNB 200 may transmit the request message in a SIB. The gNB 200 may transmit the request message in an MCCH. The gNB 200 may transmit the request message in an MAC CE multiplexed on an MTCH.

In step S205, the UE 100 determines whether the UE 100 supports reception of the multicast data in the RRC inactive state.

If the UE 100 is determined to support reception of the multicast data in the RRC inactive state (step S205: YES), the UE 100 transmits an acknowledgement to the request message to the gNB 200 in step S206. The UE 100 may transmit the acknowledgement in an RRC message (a UE Assistance Information message, an MBS Interest Indication message, or the like). For example, the UE 100 transmits state information indicating the RRC inactive state (Preferred RRC-state: inactive) as an acknowledgement. The UE 100 may transmit the acknowledgement in the MAC CE.

If the UE 100 is determined not to support reception of the multicast data in the RRC inactive state (step S205: NO), the UE 100 may transmit a negative acknowledgement to the request message to the gNB 200 in step S207. Note that in this case, the UE 100 need not transmit a negative acknowledgement.

When the UE 100 transmits uplink data in step S202, the UE 100 may set the contents of the response to the request message in further consideration of whether transmission of the uplink data is expected. Specifically, if transmission of the uplink data is not expected, the UE 100 transmits an acknowledgement to the gNB 200. The UE 100 may transmit an acknowledgement to the gNB 200 if transmission of the uplink data corresponding to the MBS session identifier included in the request message is not expected. Description will be continued below on the assumption that the UE 100 has transmitted an acknowledgement to the gNB 200.

In step S208, the gNB 200 specifies the UE 100 to be caused to transition to the RRC inactive state. The gNB 200 may specify the UE 100 that has transmitted an acknowledgement as the UE 100 to be caused to transition to the RRC inactive state. The gNB 200 may specify the UE 100 to be caused to transition to the RRC inactive state by further considering the movement state of the UE 100 as in step S108.

The operations of steps S209 to S214 are the same as and/or similar to the operations of steps S109 to S114.

Third Operation Pattern

A third operation pattern according to an embodiment is described focusing on differences from the above-described operation patterns.

When the UE 100 supports reception of multicast data in the RRC inactive state in the third operation pattern, the UE 100 transmits capability information indicating that the UE 100 supports reception of the multicast data in the RRC inactive state to the gNB 200. As a result, the gNB 200 understands that there will be no problem if the UE 100 is caused to transition to the RRC inactive state, and can cause the UE 100 to transition to the RRC inactive state when a congested state occurs.

Figure 11:
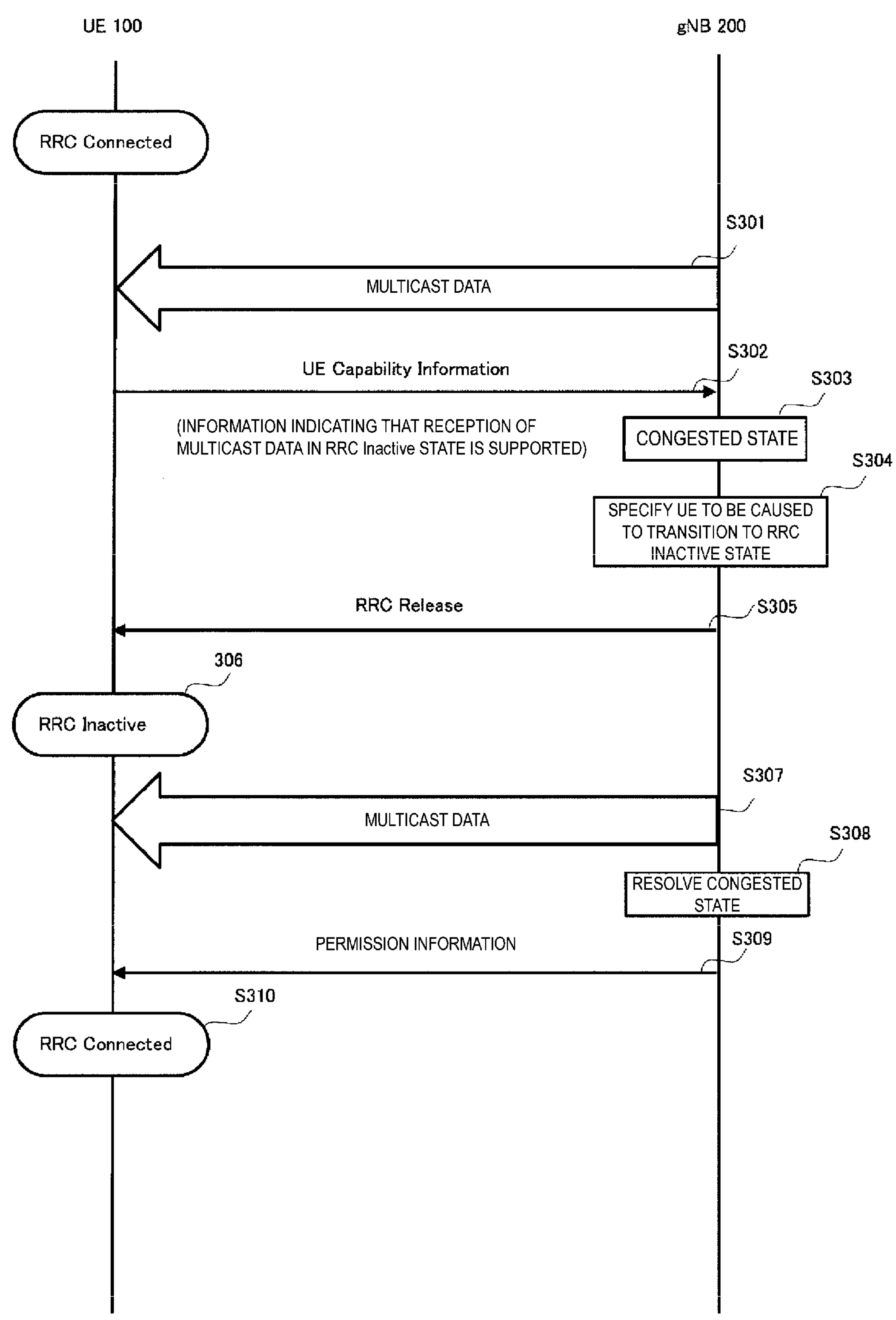
FIG. 11 is a diagram illustrating an operation example of a third operation pattern according to an embodiment.

FIG. 11 is a diagram illustrating an operation example of the third operation pattern according to an embodiment. In the initial state of FIG. 11, it is assumed that the UE 100 is in the RRC connected state and MBS configuration has been configured from the gNB 200 to the UE 100.

The operation of step S301 is the same as and/or similar to the operation of steps S101 as illustrated in FIG. 11.

In step S302, the UE 100 transmits the capability information indicating that the UE 100 supports reception of multicast data (reception function) in the RRC inactive state to the gNB 200. The capability information is transmitted in a UE Capability Information message. The UE 100 may transmit the capability information in response to reception of a capability enquiry message (UE Capability Enquiry message) from the gNB 200. The UE 100 may transmit the capability information to the gNB 200 before receiving the multicast data. Note that such capability information is different from the capability information indicating that the UE 100 supports an MBS data reception function.

In step S303, the gNB 200 detects that a congested state has occurred.

In step S304, the gNB 200 specifies the UE 100 to be caused to transition to the RRC inactive state. The gNB 200 may specify the UE 100 that has transmitted the capability information indicating that the UE supports reception of multicast data in the RRC inactive state as the UE 100 to be transitioned to the RRC inactive state. The gNB 200 may specify the UE 100 in further consideration of the movement state of the UE 100 or the like as in step S108.

The operations of steps S305 to S310 are the same as and/or similar to the operations of steps S109 to S114.

Other Embodiments

The operation patterns described above can be separately and independently implemented, and also be implemented in combination of two or more of the operation patterns. For example, some steps in one operation pattern may be applied to another operation pattern. Some steps in one operation pattern may be replaced with some steps in another operation pattern.

In the embodiment described above, an example in which the base station is an NR base station (i.e., a gNB) is described; however, the base station may be an LTE base station (i.e., an eNB). The base station may be a relay node such as an Integrated Access and Backhaul (IAB) node. The base station may be a Distributed Unit (DU) of the IAB node.

A program causing a computer to execute each of the processes performed by the UE 100 or the gNB 200 may be provided. The program may be recorded in a computer readable medium. Use of the computer readable medium enables the program to be installed on a computer. The computer readable medium on which the program is recorded may be a non-transitory recording medium. The non-transitory recording medium is not particularly limited, and may be, for example, a recording medium such as a CD-ROM or a DVD-ROM.

Circuits for executing each of the processes performed by the UE 100 or the gNB 200 may be integrated, and at least part of the UE 100 or the gNB 200 may be configured as a semiconductor integrated circuit (a chipset or a System on a Chip (SoC)).

Embodiments have been described above in detail with reference to the drawings, but specific configurations are not limited to those described above, and various design variation can be made without departing from the gist of the present disclosure.

REFERENCE SIGNS

10: NG-RAN (5G RAN)
20: 5GC (5G CN)
100: UE
110: Receiver
120: Transmitter
130: Controller
200: gNB
210: Transmitter
220: Receiver
230: Controller
240: Backhaul communicator

The invention claimed is:

1. A communication control method used in a mobile communication system for providing a multicast broadcast service (MBS), the method comprising the steps of:

receiving, by a user equipment in a Radio Resource Control (RRC) connected state, multicast data from a network node, the multicast data being MBS data transmitted in multicast;

transmitting, by the user equipment to the network node, information indicating that the user equipment supports reception of the multicast data in an RRC inactive state; and receiving, by the user equipment, the multicast data in the RRC inactive state when transmitting of uplink data associated with the multicast data is not expected.

2. The communication control method according to claim 1, further comprising:

transmitting, from the user equipment to the network node, state information indicating the RRC connected state as an RRC state preferred by the user equipment, when the user equipment does not support reception of the multicast data in the RRC inactive state.

3. The communication control method according to claim 1, further comprising the steps of:

causing, by the network node, the user equipment to transition to the RRC inactive state; and transmitting, by the network node in broadcast or multicast, permission information for permitting the user equipment in the RRC inactive state to transition to the RRC connected state.

4. The communication control method according to claim 1, further comprising the steps of:

receiving, by the user equipment, a request for transitioning to the RRC inactive state from the network node; and transmitting, by the user equipment to the network node, an acknowledgement to the request when the user equipment supports reception of the multicast data in the RRC inactive state.

5. The communication control method according to claim 4, further comprising:

transmitting, by the network node, the request in multicast.

6. The communication control method according to claim 4, further comprising:

transmitting, by the user equipment, uplink data associated with the multicast data, wherein the transmitting of the acknowledgement comprises transmitting the acknowledgement when the user equipment supports the reception of the multicast data in the RRC inactive state and transmission of the uplink data is not expected.

7. The communication control method according to claim 4, further comprising the steps of:

causing, by the network node, the user equipment to transition to the RRC inactive state in response to receiving the acknowledgement; and transmitting, by the network node, permission information for permitting the user equipment in the RRC inactive state to transition to the RRC connected state.

8. The communication control method according to claim 1, further comprising:

transmitting, by the user equipment to the network node, capability information indicating that the user equipment supports reception of multicast data in an RRC inactive state, when the user equipment supports the reception of the multicast data in the RRC inactive state.

9. A user equipment comprising a processor, a transmitter and a receiver, the processor configured to control:

the receiver to receive, while the user equipment is in a Radio Resource Control (RRC) connected state, multicast data from a network node, the multicast data being MBS data transmitted in multicast;

the transmitter to transmit, to the network node, information indicating that the user equipment supports reception of the multicast data in an RRC inactive state; and the receiver to receive the multicast data while the user equipment is in the RRC inactive state when the transmitter is not expected to transmit uplink data associated with the multicast data.

* * * * *